(12) United States Patent
Norris et al.

(10) Patent No.: US 10,871,888 B2
(45) Date of Patent: Dec. 22, 2020

(54) SYSTEMS, METHODS, AND INTERFACES FOR RAPID COATING GENERATION

(71) Applicant: PPG Industries Ohio, Inc., Cleveland, OH (US)

(72) Inventors: Alison M. Norris, Avon, OH (US); Paul Beymore, Vermilion, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 249 days.

(21) Appl. No.: 15/963,790

(22) Filed: Apr. 26, 2018

(65) Prior Publication Data

US 2019/0332254 A1    Oct. 31, 2019

(51) Int. Cl.
| | | |
|---|---|---|
| G06F 3/0484 | (2013.01) | |
| G06F 3/0482 | (2013.01) | |
| G06N 7/00 | (2006.01) | |

(52) U.S. Cl.
CPC ........ G06F 3/04847 (2013.01); G06F 3/0482 (2013.01); G06N 7/005 (2013.01)

(58) Field of Classification Search
None
See application file for complete search history.

(56) References Cited

U.S. PATENT DOCUMENTS

| | | | |
|---|---|---|---|
| 3,927,944 A | 12/1975 | Iwahashi | |
| 3,972,617 A | 8/1976 | Shibata | |
| 4,092,069 A | 5/1978 | Fukuda | |
| 4,164,374 A | 8/1979 | Lambe | |
| 4,344,142 A | 8/1982 | Diehr, II | |
| 4,479,718 A | 10/1984 | Alman | |
| 4,544,424 A | 10/1985 | Take | |

(Continued)

FOREIGN PATENT DOCUMENTS

| | | |
|---|---|---|
| CN | 1635957 | 7/2005 |
| CN | 1797420 | 7/2006 |

(Continued)

OTHER PUBLICATIONS

Office Action dated Mar. 26, 2018 from U.S. Appl. No. 13/832,554, filed Mar. 15, 2013.

(Continued)

Primary Examiner — Kevin Ky
(74) Attorney, Agent, or Firm — Workman Nydegger

(57) ABSTRACT

A computer system for optimizing a coating formulation through a user interface processes spectrometric data through a probabilistic colorant analysis. The probabilistic colorant analysis generates a set of colorants that are each associated with a calculated probability that the associated colorant is present within a target coating. The system identifies a proposed group of colorants from within the set of colorants that are associated with the highest calculated probabilities of being present within the target coating. The system displays on a graphical user interface an indication of each colorant within the proposed group of colorants. The system receives input through one or more selectable interface elements that define a user-defined group of colorants selected from the proposed group of colorants. The system generates a coating formulation, wherein the coating formulation is generated from the user-defined group of colorants.

20 Claims, 7 Drawing Sheets

(56) References Cited

U.S. PATENT DOCUMENTS

| | | | |
|---|---|---|---|
| 4,711,580 A | 12/1987 | Venable | |
| 5,231,472 A | 7/1993 | Marcus | |
| 5,319,437 A | 6/1994 | Van Aken | |
| 5,590,251 A | 12/1996 | Takagi | |
| 5,612,928 A | 3/1997 | Haley | |
| 5,926,262 A | 7/1999 | Jung | |
| 6,056,821 A | 5/2000 | Nihongi | |
| 6,166,841 A | 12/2000 | Pringle | |
| 6,249,751 B1 | 6/2001 | Asaba et al. | |
| 6,449,384 B2 | 9/2002 | Di Venuto | |
| 6,539,325 B1 | 3/2003 | Numata | |
| 6,794,669 B2 | 9/2004 | Chelvayohan et al. | |
| 7,809,155 B2 | 10/2010 | Nestares | |
| 7,944,561 B2 | 5/2011 | Nisper et al. | |
| 8,345,252 B2 | 1/2013 | Nisper et al. | |
| 8,606,731 B2 | 12/2013 | Fujieda et al. | |
| 8,879,066 B2 | 11/2014 | Norris | |
| 9,007,588 B1* | 4/2015 | Igarashi | G05D 11/132 356/402 |
| 9,482,657 B2 | 11/2016 | Bell | |
| 2003/0208345 A1 | 11/2003 | O'Neill | |
| 2004/0111435 A1* | 6/2004 | Herbert | G01J 3/02 |
| 2004/0218182 A1 | 11/2004 | Alman et al. | |
| 2005/0128484 A1 | 6/2005 | Rodrigues | |
| 2005/0169518 A1 | 8/2005 | Boston et al. | |
| 2005/0206383 A1 | 9/2005 | Park | |
| 2006/0030060 A1 | 2/2006 | Noguchi et al. | |
| 2006/0045831 A1 | 3/2006 | Galembeck | |
| 2006/0176479 A1* | 8/2006 | Laurence | G01J 1/42 356/317 |
| 2006/0245632 A1 | 11/2006 | Nisper et al. | |
| 2007/0019887 A1 | 1/2007 | Nestares | |
| 2007/0172113 A1 | 7/2007 | Sai et al. | |
| 2007/0200337 A1 | 8/2007 | Johnson et al. | |
| 2007/0226158 A1 | 9/2007 | Woronow | |
| 2007/0250273 A1 | 10/2007 | De Haas | |
| 2007/0263265 A1 | 11/2007 | Sekine | |
| 2008/0052023 A1 | 2/2008 | Kettler | |
| 2008/0177586 A1 | 7/2008 | Jamjoom | |
| 2008/0235224 A1 | 9/2008 | Rodrigues | |
| 2008/0278592 A1 | 11/2008 | Kuno et al. | |
| 2008/0278723 A1 | 11/2008 | Merchak | |
| 2009/0015835 A1 | 1/2009 | Balakrishnen et al. | |
| 2009/0157212 A1 | 6/2009 | McClanahan | |
| 2009/0190839 A1 | 7/2009 | Higgins | |
| 2009/0213120 A1 | 8/2009 | Nisper et al. | |
| 2009/0292520 A1 | 11/2009 | Nwankpa | |
| 2010/0048242 A1 | 2/2010 | Rhoads | |
| 2010/0228511 A1 | 9/2010 | Chin et al. | |
| 2011/0045517 A1* | 2/2011 | Derringer | C12Q 1/46 435/20 |
| 2011/0170796 A1* | 7/2011 | Qian | G06T 5/10 382/264 |
| 2011/0242562 A1 | 10/2011 | Vrhel | |
| 2011/0282613 A1 | 11/2011 | Skinner | |
| 2012/0225190 A1 | 9/2012 | Steenhoek | |
| 2012/0243797 A1 | 9/2012 | Di Venuto | |
| 2012/0303376 A1 | 11/2012 | Shishido | |
| 2013/0096438 A1* | 4/2013 | Fehre | A61B 1/041 600/478 |
| 2013/0244197 A1 | 9/2013 | Tijoe | |
| 2014/0078293 A1 | 3/2014 | Beymore | |
| 2014/0118936 A1 | 5/2014 | Merlet et al. | |
| 2014/0242271 A1 | 8/2014 | Prakash et al. | |
| 2014/0250109 A1 | 9/2014 | Wang | |
| 2014/0278251 A1 | 9/2014 | Norris | |
| 2014/0278253 A1 | 9/2014 | Beymore | |
| 2014/0278254 A1 | 9/2014 | Beymore | |
| 2015/0023054 A1 | 1/2015 | Goda | |
| 2015/0127269 A1 | 5/2015 | Bell | |
| 2015/0134269 A1 | 5/2015 | Norris | |
| 2015/0134299 A1 | 5/2015 | Norris | |
| 2015/0134300 A1 | 5/2015 | Norris | |
| 2016/0307602 A1* | 10/2016 | Mertens | G11B 27/11 |
| 2017/0107576 A1 | 4/2017 | Babiarz et al. | |
| 2017/0184452 A1* | 6/2017 | Baron | G01J 3/0264 |
| 2017/0233787 A1* | 8/2017 | Sebba | C12Q 1/32 435/7.92 |
| 2018/0125207 A1* | 5/2018 | Shami | B01F 13/1063 |
| 2019/0120695 A1* | 4/2019 | Liefferink | G01J 3/52 |
| 2019/0301935 A1* | 10/2019 | Borremans | G01J 3/28 |

FOREIGN PATENT DOCUMENTS

| | | |
|---|---|---|
| CN | 101184986 | 5/2008 |
| CN | 101646929 | 2/2010 |
| CN | 101784871 | 7/2010 |
| CN | 102549545 | 7/2012 |
| JP | 07150081 | 6/1995 |
| JP | 2002236850 | 8/2002 |
| JP | 2006053070 A | 2/2006 |
| JP | 2006277555 | 10/2006 |
| JP | 2006284601 A | 10/2006 |
| JP | 2007218895 | 8/2007 |
| JP | 2008039525 A | 2/2008 |
| JP | 2008215914 A | 9/2008 |
| JP | 2010242018 | 10/2010 |
| KR | 20100102147 | 9/2010 |
| TW | 200608310 | 3/2006 |
| TW | 200821602 | 5/2008 |
| TW | I298466 | 7/2008 |
| TW | 200834273 | 8/2008 |
| TW | 201339652 | 10/2013 |
| WO | 2003063719 | 8/2003 |
| WO | 2006096521 | 9/2006 |
| WO | 2006112864 | 10/2006 |
| WO | 2007096402 | 1/2009 |
| WO | 2013049792 | 4/2013 |
| WO | 2013116192 | 8/2013 |
| WO | 2014150337 | 9/2014 |

OTHER PUBLICATIONS

Office Action dated Oct. 30, 2018 from U.S. Appl. No. 13/832,554, filed Mar. 15, 2013.
Notice of Allowance dated Jul. 9, 2019 from U.S. Appl. No. 13/832,554, filed Mar. 15, 2013.
Notice of Allowance dated Aug. 9, 2019 from U.S. Appl. No. 13/832,554, filed Mar. 15, 2013.
Office action dated Jul. 31, 2017 from Chinese Patent Application No. 201480015524 filed Mar. 10, 2014.
Notice of Grant dated Nov. 3, 2017 from Chinese Patent Application No. 201480015524 filed Mar. 10, 2014.
International Search Report dated Dec. 4, 2014 from International Patent Application No. PCT/US2014/022369 filed Mar. 10, 2014.
International Preliminary Report on Patentability dated Sep. 15, 2015 from International Patent Application No. PCT/US2014/022369 filed Mar. 10, 2014.
Office action dated Feb. 28, 2017 from Korean Patent Application No. 20157025129 filed Mar. 10, 2014.
Exam Report dated Apr. 10, 2019 from European Patent Application No. 14717546 filed Mar. 10, 2014.
Office Action dated Oct. 14, 2016 from Japanese Patent Application No. 2016500952 filed Mar. 10, 2014.
Office Action dated Jun. 16, 2017 from Japanese Patent Application No. 2016500952 filed Mar. 10, 2014.
Decision to Grant dated Feb. 2, 2018 from Japanese Patent Application No. 2016500952 filed Mar. 10, 2014.
Office Action dated Dec. 15, 2016 from Canadian Patent Application No. 2903458 filed Mar. 10, 2014.
Notice of Allowance dated Apr. 13, 2018 from U.S. Appl. No. 13/835,675, filed Mar. 15, 2013.
Notice of Allowance dated Aug. 7, 2018 from U.S. Appl. No. 13/835,675, filed Mar. 15, 2013.
Issue Notification dated Nov. 14, 2018 from U.S. Appl. No. 13/835,675, filed Mar. 15, 2013.
International Search Report dated Nov. 28, 2014 from International Patent Application No. PCT/US2014/022983 filed Mar. 11, 2014.

(56) References Cited

OTHER PUBLICATIONS

International Report on Patentability dated Sep. 15, 2015 from International Patent Application No. PCT/US2014/022983 filed Mar. 11, 2014.
Office Action dated Aug. 11, 2017 from Chinese Patent Application No. 201480015523.1 filed Mar. 11, 2014.
Notification of Grant dated Dec. 14, 2017 from Chinese Patent Application No. 201480015523.1 filed Mar. 11, 2014.
Decision to Grant dated May 16, 2017 from Japanese Patent Application No. 2016-50119 filed Mar. 11, 2014.
Office Action dated Dec. 9, 2016 from Canadian Patent Application No. 2903466 filed Mar. 11, 2014.
Niedzinski, Cezary et al. and Bayesian Approach to Spectrophotometric Analysis of Multicomponent Substances and IEEE Transactions on Instrumentation and Measurement, Jun. 2000, vol. 49, No. 3, pp. 67-642.
*Alice* vs *CLS Bank* (Supreme Court Decision) (2013).
Anonymous, "Chapter 1.3.5.17. Detection of Outliers", NIST/Sematech e-Handbook of Statistical Methods, Jan. 1, 2012, Xp055162021.
Beymore, Paul M. U.S. Appl. No. 14/121,869, "Pigment Identification of Complex Coating Mixtures with Sparkle Color", filed Oct. 28, 201.
D. Puig, M.A. Garcia, J. Melendez: "Application-(dependent feature slection for texture classification", Pattern Recognition, vol. 43, No. 10, May 10, 2010 (May 10, 2010) pp. 3182-3297, XP027095420, DOI: 10.1016/j.patcog.2010.05.005 abstract and section 3.
E. Kirchner: "Appearance and measurement modeling an drendering of hte visual texture of automotive paints", Detroit Color Council, Mar. 13, 2013, XP055153196, Retreived from the Internet: URL: http://www.detroitcc.org/files/2013March14b.pdf, [retreived on Apr. 3, 2013] Models for predicting texture.
E.J.J Kirchner, J. Ravi: "Setting tolerances on color and texture for automotive coating", Color Research & Application, vol. 39, No. 1, Jul. 25, 2012 pp. 88-98, XP055152561, DOI: 10.1002/col.21767.
Harkins et al. "Identification of pigments in paint products by infrared spectroscopy," Analytical Chemistry, 1959.
I. Lissner, U. Philipp: "Upgrading Color-Difference Formulas", Jouranl fo the Optical Society of America, vol. 27, No. 7, Jun. 11, 2010 (Jun. 11, 2010), pp. 1620-1629, XP055152562, DOI: 10,1364/JOSAA.27.001620 Sections 1 and 2.A.
International Search Report and Written Opinion for application No. PCT/US2014/022983 dated Nov. 28, 2014.
J.H. Xin, S. Shao, K.F.-L. Chung: "Colour-appearance modelling using feedforward networks with Bayesian regulariztion method—part 1: forward model" Color Research & Application, vol. 25, No. 6, Oct. 13, 2000, pp. 424-434, XP055152560, DOI: 10.1002/1520-6378(200012)25:6<424:"AID_COL7>3.0CO;2-Q.
Janina et al. "Examination of multilayer paint coats by the use of infrared, Raman and XRF spectroscopy for forensic purposes" J. of Molecular Structure, 2006.
Kokla, Vassiliki et al. "A Bayesian decision model for watercolour analysis," Proc. of SPIE, 2007, vol. 6618, pp. 66180S-1-66180S-9.
Kuncheva, Ludmila I., James C. Bezdek, and Robert PW Duin, "Decision templates for multiple classifier fusion: an experimental comparison" Pattern Recognition, 34.2. 2001.
Massonnet et al. "Identification of organic pigments in coatings: applications to red automotive topcoats" First Meeting of the European Academy of Forensic Sciences, 1997.
Paravina et al. "Evaluation of blending effect of composites related to restoration size", Dental Materials, Elsevier, Amsterdam, NL, vol. 22, No. 4, Apr. 1, 2006, pp. 299-307, XP027943381, ISSN: 0109-5641 table 2.
PPG Automotive Refinish: "RapidMatchTMX-5: guida utente", Pittsburgh Plate Glass (PPG) Industries, 2013, XP055153237, retreived from the internet: URL: http://it.nexaautocolor.com/media/213903/rapidmatch_v1-2012_email_version.pdf [retreived on Sep. 22, 2014].
Rafik, "Bulk optical properties of phthalocayanin pigment particles", Can. J. Chem. 1980.
Sun, et al. Crooks in Molecular Interaction Between Organized, Surface Confided Monolayers and Vapor-Phas Probe Molecules. 5. Acid-Based Interactions, 1993, American Chemical Society, pp. 1775-1780.
Takagi et al. "Prediction of spectral reflectance factor distribution of color-shift paint finishes" Color Research & Application, John Wiley and Sons, Inc., US, vol. 32, No. 5, Oct. 1, 2007, pp. 378-387, XP002604927, ISSN: 0361-2317.
Takuro Yonesawa, "An Event Decription Language Using Temporal Relation for Smart Object Services", IPSJ SIG Technical Report 2008-MBL-44, Mobile computing and ubiquitous communication, 2008-UBI-17, Ubiquitous computing system, Information Processing Society of Japan, Feb. 27, 2008, vol. 2008, No. 18, pp. 75-82.
Wang Qiang "Texture Analysis and Classification Based on Bayesian Network Model", Computer Aided Design & Computer Graphics, Dec. 31, 2007, pp. 1565-1568.
Chinese Office Action for application No. 201480015524.6 dated Dec. 26, 2016.
Chinese Office Action for application No. 201480015523.1 dated Feb. 7, 2017.
Japanese Office Action for application No. JP2016-501119 dated Nov. 7, 2016.
Korean Office Action for application No. 2015-7025129 dated Dec. 29, 2016.
Korean Office Action for application No. 2015-07025129 dated Jun. 21, 2016.
Korean Office Action for application No. 2015-7025121 dated Jan. 31, 2017.
Korean Office Action for application No. 2015-7025121 dated Jul. 25, 2016.
Office Action in application No. 201480070100.x dated Feb. 27, 2017.
Taiwan Office Action for application No. 103109480 dated Jul. 17, 2016.
Taiwan Office Action for application No. 103109480 dated Sep. 17, 2015.
Office Action for U.S. Appl. No. 13/832,116 dated Mar. 5, 2014.
Office Action for U.S. Appl. No. 13/835,675 dated Sep. 16, 2015.
Office Action for U.S. Appl. No. 13/832,554 dated Sep. 23, 2015.
Office Action for U.S. Appl. No. 13/835,675 dated Feb. 4, 2016.
Office Action for U.S. Appl. No. 13/832,554 dated Apr. 20, 2016.
Notice of Allowance for U.S. Appl. No. 13/835,675 dated Nov. 1, 2016.
Office Action for U.S. Appl. No. 14/535,399 dated Apr. 4, 2017.
Office Action for U.S. Appl. No. 14/535,380 dated Apr. 12, 2017.
Office Action for U.S. Appl. No. 13/832,554 dated May 2, 2017.
Office Action for U.S. Appl. No. 13/835,675 dated May 2, 2017.
Office Action for U.S. Appl. No. 14/535,372 dated Jun. 20, 2017.
Office Action for U.S. Appl. No. 13/832,554 dated Sep. 6, 2017.
Office Action for U.S. Appl. No. 14/535,372 dated Oct. 6, 2017.
Office Action for U.S. Appl. No. 14/535,380 dated Oct. 27, 2017.
Office Action for U.S. Appl. No. 14/535,399 dated Nov. 1, 2017.
Office Action for U.S. Appl. No. 13/835,675 dated Dec. 12, 2017.
Office Action for U.S. Appl. No. 13/832,554 dated Dec. 12, 2017.
Office Action for U.S. Appl. No. 14/535,372 dated Feb. 15, 2018.
Office Action for U.S. Appl. No. 14/535,399 dated Mar. 21, 2018.
Office Action for U.S. Appl. No. 13/832,554 dated Mar. 26, 2018.
Office Action for U.S. Appl. No. 14/535,380 dated Apr. 2, 2018.
Office Action for U.S. Appl. No. 14/535,372 dated Apr. 26, 2018.
Non-Final Office Action for U.S. Appl. No. 15/963,567, dated Sep 4, 2020, 8pgs.
Non-Final Office Action received for U.S. Appl. No. 15/963,686, dated Jul. 20, 2020, 22 pages.

\* cited by examiner

| Wavelength | Angle | Reflectance Factor |
|---|---|---|
| 400 | 15 | 22.03 |
| 410 | 15 | 25.94 |
| 420 | 15 | 27.88 |
| 430 | 15 | 29.03 |
| 440 | 15 | 29.67 |
| 450 | 15 | 30.04 |
| 460 | 15 | 30.02 |
| 470 | 15 | 29.73 |
| 480 | 15 | 29.09 |
| 490 | 15 | 28.24 |
| 500 | 15 | 27.12 |
| 510 | 15 | 25.56 |
| 520 | 15 | 23.79 |
| 530 | 15 | 22.04 |
| 540 | 15 | 20.62 |
| 550 | 15 | 19.31 |
| 560 | 15 | 17.93 |
| 570 | 15 | 16.91 |
| 580 | 15 | 16.36 |
| 590 | 15 | 16.11 |
| 600 | 15 | 16.03 |
| 610 | 15 | 15.85 |
| 620 | 15 | 15.8 |
| 630 | 15 | 16.15 |
| 640 | 15 | 17.16 |
| 650 | 15 | 18.55 |
| 660 | 15 | 19.99 |
| 670 | 15 | 21.23 |
| 680 | 15 | 22.45 |
| 690 | 15 | 23.92 |
| 700 | 15 | 25.74 |
| 400 | 45 | 2.58 |
| 410 | 45 | 3 |
| 420 | 45 | 3.14 |
| 430 | 45 | 3.21 |
| 440 | 45 | 3.26 |
| 450 | 45 | 3.27 |
| 460 | 45 | 3.25 |
| 470 | 45 | 3.21 |
| 480 | 45 | 3.14 |
| 490 | 45 | 3.03 |
| 500 | 45 | 2.92 |
| 510 | 45 | 2.77 |
| 520 | 45 | 2.59 |
| 530 | 45 | 2.41 |
| 540 | 45 | 2.26 |
| 550 | 45 | 2.13 |
| 560 | 45 | 2.01 |
| 570 | 45 | 1.92 |
| 580 | 45 | 1.88 |
| 590 | 45 | 1.86 |
| 600 | 45 | 1.84 |
| 610 | 45 | 1.83 |
| 620 | 45 | 1.84 |
| 630 | 45 | 1.91 |
| 640 | 45 | 2.03 |
| 650 | 45 | 2.19 |
| 660 | 45 | 2.35 |
| 670 | 45 | 2.49 |
| 680 | 45 | 2.65 |
| 690 | 45 | 2.85 |
| 700 | 45 | 3.08 |
| 400 | 110 | 0.86 |
| 410 | 110 | 0.99 |
| 420 | 110 | 1.02 |
| 430 | 110 | 1 |
| 440 | 110 | 0.98 |
| 450 | 110 | 0.95 |
| 460 | 110 | 0.93 |
| 470 | 110 | 0.89 |
| 480 | 110 | 0.86 |
| 490 | 110 | 0.82 |
| 500 | 110 | 0.77 |
| 510 | 110 | 0.74 |
| 520 | 110 | 0.69 |
| 530 | 110 | 0.65 |
| 540 | 110 | 0.61 |
| 550 | 110 | 0.59 |
| 560 | 110 | 0.57 |
| 570 | 110 | 0.57 |
| 580 | 110 | 0.57 |
| 590 | 110 | 0.57 |
| 600 | 110 | 0.56 |
| 610 | 110 | 0.57 |
| 620 | 110 | 0.58 |
| 630 | 110 | 0.6 |
| 640 | 110 | 0.64 |
| 650 | 110 | 0.68 |
| 660 | 110 | 0.71 |
| 670 | 110 | 0.74 |
| 680 | 110 | 0.78 |
| 690 | 110 | 0.83 |
| 700 | 110 | 0.89 |

*Fig. 5*

SYSTEMS, METHODS, AND INTERFACES FOR RAPID COATING GENERATION

BACKGROUND

Modern coatings provide several important functions in industry and society. Coatings can protect a coated material from corrosion, such as rust. Coatings can also provide an aesthetic function by providing a particular color and/or texture to an object. For example, most automobiles are coated using paints and various other coatings in order to protect the metal body of the automobile from the elements and also to provide aesthetic visual effects.

In view of the wide-ranging uses for different coatings, it is often necessary to identify a target coating composition. For instance, it might be necessary to identify a target coating composition on an automobile that has been in an accident. If the target coating composition is not properly identified, any resulting repair to the automobile's coating will not match the original coating. As used herein, a target coating comprises any coating of interest that has been applied to any physical object.

There are many opportunities for new methods and systems that improve the identification of coatings.

BRIEF SUMMARY

A computer system for seeding a formulation engine comprises one or more processors and one or more computer-storage media having stored thereon executable instructions that when executed by the one or more processors configure the computer system to perform various actions. For example, the computer system can process spectrometric data through a probabilistic colorant analysis. The probabilistic colorant analysis generates a set of colorants, each colorant within the set of colorants is associated with a calculated probability that the associated colorant is present within a target coating. The computer system can then identify a proposed group of colorants from within the set of colorants.

The proposed group of colorants comprise colorants selected from the set of colorants that are associated with the highest calculated probabilities of being present within the target coating. The computer system can display on a graphical user interface an indication of each colorant within the proposed group of colorants. The computer system can also display one or more selectable interface elements on the graphical user interface. The one or more selectable interface elements are configured to select individual colorants within the proposed group of colorants. Further, the computer system can receive input through the one or more selectable interface elements. The input defines a user-defined group of colorants selected from the proposed group of colorants. Further still, the computer system can generate a coating formulation from the user-defined group of colorants.

A computerized method for use with a computer system comprising one or more processors and one or more computer-readable media having stored thereon executable instructions that when executed by the one or more processors configure the computer system to perform a method of optimizing a coating formulation through a user interface. The method displaying on a display device a graphical user interface for completing a spectrometric scan of a target coating. Additionally, the method can comprise processing spectrometric data through a probabilistic colorant analysis. The probabilistic colorant analysis generates a set of colorants, each colorant within the set of colorants is associated with a calculated probability that the associated colorant is present within the target coating. The method also comprises identifying a proposed group of colorants from within the set of colorants. The proposed group of colorants comprises colorants selected from the set of colorants that are associated with the highest calculated probabilities of being present within the target coating. In addition, the method comprises displaying on the graphical user interface an indication of each colorant within the proposed group of colorants corresponding to the target coating. Further, the method comprises displaying one or more selectable interface elements on the graphical user interface. The one or more selectable interface elements are configured to select individual colorants within the proposed group of colorants. Further still, the method comprises upon receipt of user input, generating a coating formulation from user selected colorants of the proposed group of colorants.

A computer program product comprises one or more computer storage media having stored thereon computer-executable instructions that, when executed at a processor, cause the computer system to perform a method for optimizing a coating formulation through a user interface. The method can comprise processing spectrometric data through a probabilistic colorant analysis. The probabilistic colorant analysis generates a set of colorants, each colorant within the set of colorants being associated with a calculated probability that the associated colorant is present within a target coating. The method can also comprise identifying a proposed group of colorants from within the set of colorants. The proposed group of colorants comprise colorants selected from the set of colorants that are associated with the highest calculated probabilities of being present within the target coating.

Additionally, the method can comprise displaying on a graphical user interface an indication of each colorant within the proposed group of colorants. The method can also comprise displaying one or more selectable interface elements on the graphical user interface. The one or more selectable interface elements are configured to select individual colorants within the proposed group of colorants. Further, the method can comprise receiving input through the one or more selectable interface elements. The input defines a user-defined group of colorants selected from the proposed group of colorants. Further still, the method can comprise generating a coating formulation from the user-defined group of colorants.

Additional features and advantages of the invention will be set forth in the description which follows, and in part will be obvious from the description, or may be learned by the practice of the present invention. The features and advantages of the present invention may be realized and obtained by means of the instruments and combinations particularly pointed out in the appended claims. These and other features will become more fully apparent from the following description and appended claims, or may be learned by the practice of the present invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates a table comprising spectrometric data;

DETAILED DESCRIPTION

Figure 1:
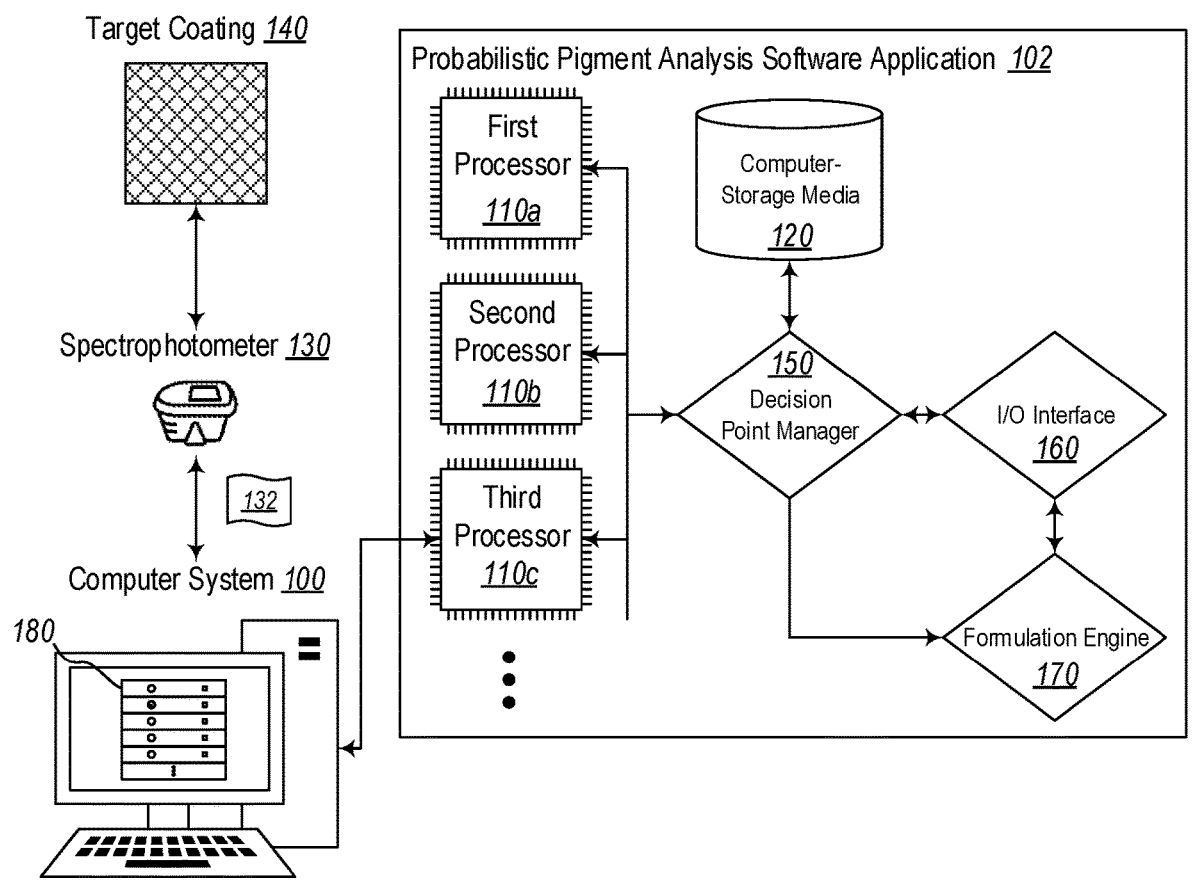
FIG. 1 illustrates a schematic diagram of a computerized system for parallel processing of spectrometric data when identifying coating texture effects.

The present invention extends to systems and methods for optimizing a coating formulation through a user interface. For example, a computer system can receive spectrometric data from a target coating. The spectrometric data can comprise spectrophotometric data, spectrocolorimetric data, data acquired via image processing, and/or any other similar data. The coating identification computer system processes the spectrometric data through a probabilistic colorant analysis. The probabilistic colorant analysis identifies a set of colorants that are likely present in the coating and associates each colorant with a probability that the colorant is present in the target coating. As used herein, colorants include pigments, including effect pigments, dyes, inks, stains, and any other related coating or coating component. A user interface can display at least a portion of the colorants that have the greatest likelihood of being within the target coating. A user is then able to manually select colorants from the display list that should be excluded and/or included as input to a formulation engine.

As such, the present invention can provide several benefits to the art. For example, one of skill in the art will appreciate that automotive coatings provide a particularly challenging set of coating parameters to match. In addition to complex colorants, such as pigments, dyes, and inks, a conventional automotive coating may comprise effect pigments such as effect pigments that provide texture to the coating. For instance, an automotive coating may comprise an effect pigment such as aluminum flakes of a particular color. The aluminum flakes may provide a texture that appears to sparkle. A proper identification of such a coating composition may require the correct identification of the presence of aluminum flakes and a proper identification of the color of the aluminum flakes.

In order to properly match a target coating, manufacturers desire to determine the components, or colorants, within the target coating. If the same colorants or appropriate offsets as those in the target coating are utilized, a formulation or search process may arrive at an apparent optimum solution as to the formulation of the target coating. On the other hand, excluding those colorants, either deliberately or inadvertently, from availability will result in a less than optimal color match.

Several conventional formulation engines and methodologies attempt to encompass colorant selection and formulation via various algorithms. These algorithms are based on spectrometric data, or characterization data relating to attributes of the target coating. For example, spectrometric data may include spectrophotometric data, spectrocolorimetric data, data acquired via image processing, and/or related metrics. Many conventional colorant identification packages and formulation engines take a "brute" force, or guess-and-check, type of approach to provide formulations and colorant information to their users. Manufacturers commonly use the guess-and-check approach, or brute force method, in which nearly all available colorants, or a subset of all available colorants, are combined in all combinations available given an end number of colorants desired in the final match.

Conventional "brute" force methods of coating identification can be inefficient. Such conventional methods may consume significant processing time and large amounts of memory to store all of the available colorants. Additionally, these methods are error prone because they tend to work on a "good enough" basis. For example, these methods are not focused on identifying the actual components of a target coating. Instead, brute force methods are generally configured to iterate through all available colorants, until a particular output is a good enough match to the target coating, which in many cases may comprise very different colorants than those that are in the target coating.

More recently, neural networks have seen significant interest for identifying compositions of target coatings. Unfortunately, neural networks suffer from slow performance, inflexibility, error propagation, and a requirement of significant overhead to meticulously manage a sometimes-large learning database and structure. The inflexibility, or rigid operation, forces a neural network generally to be used in a feedback design to optimize the node weightings leading to and within the hidden layers of the network.

In some cases, human experts assist in identifying colorants within a coating by making educated guesses about the specific colorants that may be present in a coating. Unfortunately, even experts with significant color matching experience are highly inaccurate in guessing the colorant components within a complex coating. This inaccuracy is caused, at least in part, because experts must visually match a combination of colorants that are selected from a library of hundreds or thousands of colorants that may be present in any given coating.

In contrast to conventional methods, the present invention utilizes a unique combination of a probabilistic colorant analysis that provides a ranking of potential colorants and a user interface that allows a user to further optimize the list of potential colorants. Such a system provides significant technical improvements over conventional coating formulation methods. For example, it is as a practical matter impossible for a user to visually identify every possible colorant in use around the world, especially when multiples of those colorants are combined within a single target coating. However, in many cases, a user is able to visually determine that a particular colorant is not in a target coating. Further, in some instances, due to deficiencies in coating modeling, a coating identification system that relies upon spectrometric data may identify a potential pigment within the target coating that a user could easily visually determine is a false reading. Similarly, a user may also have industry knowledge or visual knowledge that a target coating certainly does include at least one particular colorant.

As such, a user may be able to explicitly remove and/or explicitly include colorants from input to a formulation engine. One will appreciate that the ability of a user to include or exclude particular colorants from input to a formulation engine can significantly increase the efficiency of a formulation process by for example by seeding a formulation engine with one or more known colorants. Additionally, the user interface disclosed herein can provide a user with a list of colorants that a probabilistic colorant analysis identified as having a high likelihood of being present within a target coating. The user can then make a significant impact on the accuracy and performance of a formulation engine by including or excluding individual colorants from the list displayed on the user interface.

Accordingly, a probabilistic colorant analysis can provide significant technical improvements over conventional coating identification and formulation systems. For example, probabilistic colorant analysis can analytically identify potential colorants within a target coating. As used herein, "potential colorants" (also referred to as "final colorants") are colorants that are identified by a probabilistic colorant analysis as likely being in a target coating. The system can display potential colorants within a user interface. A user can then optimize the list of displayed colorants by removing and/or including particular pigments within a user-defined group of colorants that are fed into a formulation engine. As such, the formulation engine can be seeded with colorants that have already been identified as having a high probability of being present within the target coating. Resulting coating formulations are thus more likely to correctly match the formulation of the target coating because the colorants are not simply guessed-and-checked.

Additionally, a probabilistic colorant analysis can provide significant performance improvements over conventional coating identification and formulation systems. For example, instead of brute force guess-and-check methods that iterate through an entire library of colorants, the present invention can provide a formulation engine with analytically identified potential colorants from within the target coating that have been further optimized by a human user. The user-defined group of colorants can be fed into the formulation engine in order of probability. As such, resulting coating formulations are identified significantly faster than conventional methods that randomly guess what colorants may be present within a coating. As noted, this can be a dramatic time savings while at the same time providing significant improvements in accuracy.

In particular, a probabilistic colorant analysis can also provide significant speed increases over neural network systems. For example, in one laboratory experiment using a test sample, a conventional neural network required 64 seconds to produce a coating identification result. In contrast, an embodiment of a disclosed probabilistic colorant analysis, required only 20 seconds to provide a coating identification result, which is a three-times improvement over the conventional system. The disclosed probabilistic colorant analysis may be particularly suited for parallel processing which provides significant speed increases compared to conventional systems.

Accordingly, the present invention comprises unique and innovative technical structures, processes, and applications that provide several technical benefits. For example, a probabilistic colorant analysis utilizes a logical structure that easily allows for parallel processing. Additionally, a probabilistic colorant analysis calculates an entire dataset of decision points. By providing the entire dataset of decision points results, the coating identification system is able to arrive at highly accurate results that are not dependent on prior logical pathways being correctly chosen. While a few technical benefits have been explicitly pointed out for the sake of example, one will appreciate that additional technical benefits may be provided in accordance with the present invention.

Turning now to the figures, FIG. 1 illustrates a schematic diagram of a computerized system in accordance with the present invention comprising a computer system 100 for optimizing a coating formulation through a user interface 180. With respect to FIG. 1, the computer system 100 is described in the exemplary context of identifying texture effects, such as aluminum, organic mica, or man-made mica; however, one will appreciate that the computer system 100 could additionally or alternatively be used to identify any type of colorant. As used herein, a computer system used with the invention comprises any combination of one or more processors 110($a$-$c$) and computer-readable storage media 120. For example, a processor (e.g., "first processor" 110$a$) may comprise an integrated circuit, a field-programmable gate array (FPGA), a microcontroller, an analog circuit, or any other electronic circuit capable of processing input signals. Examples of computer-readable storage media 120 include RAM, ROM, EEPROM, solid state drives ("SSDs"), flash memory, phase-change memory ("PCM"), optical disk storage, magnetic disk storage or other magnetic storage devices, or any other hardware storage device(s).

The computer system 100 can comprise one or more computer-readable storage media 120 having stored thereon executable instructions that when executed by the one or more processors 110($a$-$c$) configure the computer system 100 to execute a probabilistic colorant analysis software application 102. As used herein, a "probabilistic colorant analysis" can comprise an analysis of a target coating 140 that produces one or more potential colorants and probabilities associated with the likelihood that each of the potential colorants is present within the target coating 140.

For example, the probabilistic colorant analysis software application 102 can cause the computer system 100 to receive spectrometric data 132 from a target coating 140. The spectrometric data 132 may be gathered for example by a spectrometer, such as spectrophotometer 130, or any other device capable of scanning a target coating 140 and providing characterization data relating to attributes of the target coating 140. The probabilistic colorant analysis software application 102 can then process the spectrometric data through a probabilistic colorant analysis. The probabilistic colorant analysis, in turn, generates a set of colorants; each colorant within the set of colorants being associated with a calculated probability that the associated colorant is present within the target coating 140.

The probabilistic colorant analysis software application 102 may perform a probabilistic colorant analysis through the use of colorant decision points. For example, a decision point manager 150 initiates a set of colorant decision points. As used herein, a decision point manager 150 comprises a software and/or hardware component that manages the initiation and processing of colorant decision points within the probabilistic colorant analysis software application 102. Additionally, as used herein, a colorant decision point comprises a set of independent calculations of the spectrometric data 132 that each provide an independent assessment about the presence of a particular effect pigment type within the target coating 140 and that are individually weighted by the colorant decision point to provide a probability that the particular effect pigment type is within the target coating 140. As used herein, an independent calculation comprises an independent assessment about the presence of a particular effect pigment type within the target coating 140 that does not require as an input the output of any other independent calculation within a respective colorant decision point. Initiating a colorant decision point may comprise loading the colorant decision point from a computer-readable storage medium.

When initiating the set of colorant decision points, the decision point manager 150 may initiate multiple different decision points. For example, the decision point manager 150 may initiate a second colorant decision point for identifying a probability that a second effect pigment type is present within the target coating 100. The second colorant decision point comprises a second set of independent calculations of the spectrometric data 132 that each provide an independent assessment about the presence of the second effect pigment type within the target coating 140.

The first set of independent calculations associated with a first colorant decision point may be different than the second set of independent calculations associated with the second colorant decision point. For example, the first colorant decision point may be directed towards identifying the presence of an aluminum texture effect pigment while the second colorant decision point may be directed towards identifying the presence of a mica effect pigment. Similarly, the second set of independent calculations associated with a second colorant decision point may be a subset of the first set of independent calculations associated with the first colorant decision point. For example, the first colorant decision point may be directed toward identifying the presence of an aluminum texture effect pigment while the second colorant decision point may be directed toward identifying the presence of lenticularly-shaped aluminum texture effect pigment.

Once the computer system 100 initiates the set of colorant decision points, the decision point manager 150 manages the parallel processing of the colorant decision points. As part of this management, the decision point manager 150 can calculate the colorant decision points in parallel by initiating a calculation of a first set of independent calculations associated with a first colorant decision point, and a second set of independent calculations associated with a second colorant decision point within parallel threads. For example, the decision point manager 150 can provide different colorant decision points to a first processor 110*a*, a second processor 110*b*, a third processor 110*c*, and so forth. One of skill in the art will appreciate that modern processing units comprise various different parallel processing functionalities and capabilities. For instance, many modern processing units comprise multiple cores on a single silicon die. Further, some modern processing units also provide multiple virtual cores that allow the simultaneous processing of multiple threads on a single core.

One will appreciate that the illustrated decision point manager 150 represents an abstraction of the multi-threaded nature of the colorant decision points. For example, at least a portion of the colorant decision points are capable of being processed as independent threads within a parallel processing system. Each independent calculation within each colorant decision point may also be capable of being processed as an independent thread within a parallel processing system. The decision point manager 150 manages the parallel processing of each colorant decision point and also tracks the calculated results received from each independent calculation and each colorant decision point.

Once the parallel calculations are complete, each colorant decision point provides a decision-point probability that the particular colorant type (in this case an effect pigment type) is present within a target coating 140. The probabilities are each calculated based upon a weighted combination of the results of each independent calculation within the set of independent calculations. Using the various probabilities provided by the colorant decision points, the decision point manager 150 calculates a set of colorants and colorant probabilities. The computer system 100 calculates each colorant probability within the set of colorant probabilities by combining a unique subset of decision-point probabilities calculated by the set of colorant decision points. Each colorant probability indicates a probability that an associated colorant is present within the target coating.

Once the computer system 100 completes calculating the colorant probabilities, the probabilistic colorant analysis software application 102 within the computer system 100 may provide at least a portion of the colorant probabilities to an end user through an input/output (I/O) interface 160. For example, the probabilistic colorant analysis software application 102 may identify a proposed group of colorants from within the set of colorants. The proposed group of colorants comprise colorants selected from the set of colorants that are associated with the highest calculated probabilities of being present within the target coating 140.

Once the system 100 identifies the proposed group of colorants, the I/O interface 160 may cause a computer to display on a graphical user interface 180 (also shown in FIG. 7) an indication of each colorant within the proposed group of colorants. The graphical user interface 180 may list the colorants within the proposed group of colorants in order of highest probability. The list of colorants may comprise a name and image of each colorant so that a user can visually compare the depicted colorant images with the target coating 140.

Figure 7:
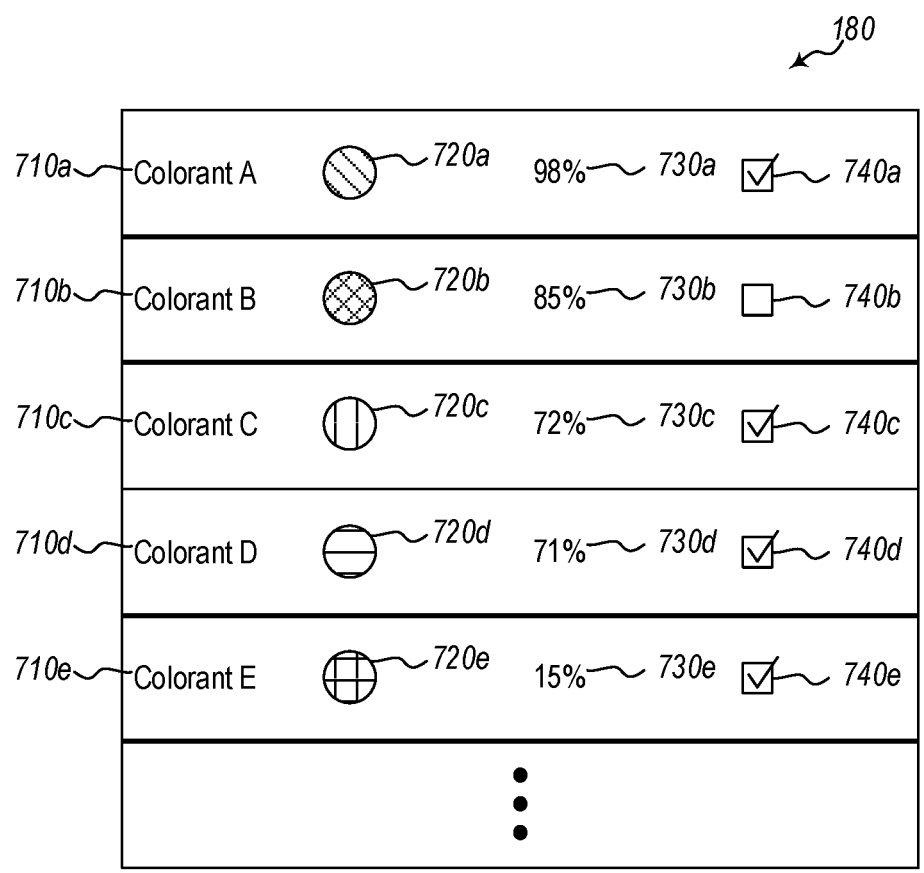
FIG. 7 depicts a graphical user interface for selecting colorants within a formulation engine.

Additionally, the graphical user interface 180 can display one or more selectable interface elements (shown as 740(*a-e*) in FIG. 7) on the graphical user interface 180. The one or more selectable interface elements 740(*a-e*) are configured to allow selecting one or more individual colorants within the proposed group of colorants. The one or more selectable interface elements 740(*a-e*) allow a user to provide input to the probabilistic colorant analysis software application 102 regarding the proposed group of colorants. For example, the I/O interface 160 can receive input through the one or more selectable interface elements 740(*a-e*) such that the input defines a user-defined group of colorants selected from the proposed group of colorants. As such, a user can remove colorants that are clearly not within the target coating 140 and/or explicitly include within a formulation engine, colorants that are clearly within the target coating 140.

The probabilistic colorant analysis software application 102 can then add at least a portion of the colorants within the user-defined group of colorants to a formulation engine (e.g., 170). As used herein the "proposed group of colorants" refer to colorants that are identified by the probabilistic colorant analysis software application 102 as potentially being present within a target coating 140. Further, as used herein the "user-defined group of colorants" comprise colorants from the proposed group of colorants after a user has explicitly included or removed particular colorants.

Each colorant within the proposed group of colorants is associated with a probability (also referred to herein as a "colorant probability") that indicates the likelihood that the colorant is present within the target coating 140. Additionally, each colorant within the proposed group of colorants may be associated with a probability above a threshold probability. For example, the probabilistic colorant analysis software application 102 may limit the proposed group of colorants to only colorants that are associated with a probability that is above a threshold level. As explained herein, the computer system 100 can further allow the user to exclude and/or include colorants shown on the display from or to the proposed group of colorants, respectively. As such, the computer system 100 provides a narrowed subset of colorants within the proposed group of colorants based purely on probabilistic analysis. The user is then able to further optimize the proposed group of colorants into a user-defined group of colorants.

The formulation engine 170 may comprise any formulation process capable of generating a coating composition based upon potential colorants. For example, the formulation engine may utilize a Kubelka-Munk formulation process. The formulation engine 170 may be configurable to send resulting formulations to the I/O interface 160. The I/O interface can then display the resulting formulation to the end user and/or communicate the formulation to a coating mixing machine in communication with the computer system for production.

The probabilistic colorant analysis software application 102 can add the colorants to the formulation engine 170 in order of decreasing calculated probability of being present in the target coating. In the case that the user has excluded particular colorants, the probabilistic colorant analysis software application 102 can add the colorants to the formulation engine 170 in order of decreasing probability of being present in the target coating while excluding the user-excluded colorants. In contrast, in the case that the user explicitly includes one of the colorants, the user-selected colorant may always be added to the formulation engine 170 through every iteration of the formulation engine 170.

Using the added colorants, the formulation engine 170 can generate a coating formulation that is calculated to match the target coating within a predetermined qualitative or quantitative threshold. The predetermined qualitative or quantitative threshold may be user definable and/or defined based upon analytical determinations of a threshold level of visual match between a proposed coating formulation and a target coating 140.

The probabilistic colorant analysis software application 102 can iteratively add colorants selected from the user-defined group of colorants to the formulation engine 170 in order of decreasing probability of being present in the target coating until the predetermined qualitative or quantitative threshold is met. For example, the probabilistic colorant analysis software application 102 can add to the formulation engine 170 the one or more user-included colorants.

In the case that the first colorant does not meet the predetermined qualitative or quantitative threshold, the probabilistic colorant analysis software application 102 can continue to iteratively add additional colorants selected from the set of final colorants in order of decreasing calculated probability of being present in the target coating. For instance, the probabilistic colorant analysis software application 102 can add a second colorant associated with the second highest probability within the user-defined group of colorants. The computer system 100 can continue this process until a resulting formulation meets the predetermined qualitative or quantitative threshold or until all of colorants within the user-defined group of colorants are exhausted.

Accordingly, a graphical user interface 180 may provide a user with a proposed group of colorants that have been analytically identified as likely being within a target coating. A user can then optimize the input to a formulation engine 170 by requiring that certain colorants are included and/or are not included within the input. As such, a combination of novel colorant identification with a probabilistic colorant analysis and a user's visual analysis of the target coating 140 and/or industry knowledge can be used to generate a user-defined group of colorants that are entered into a formulation engine 170.

Figure 2:
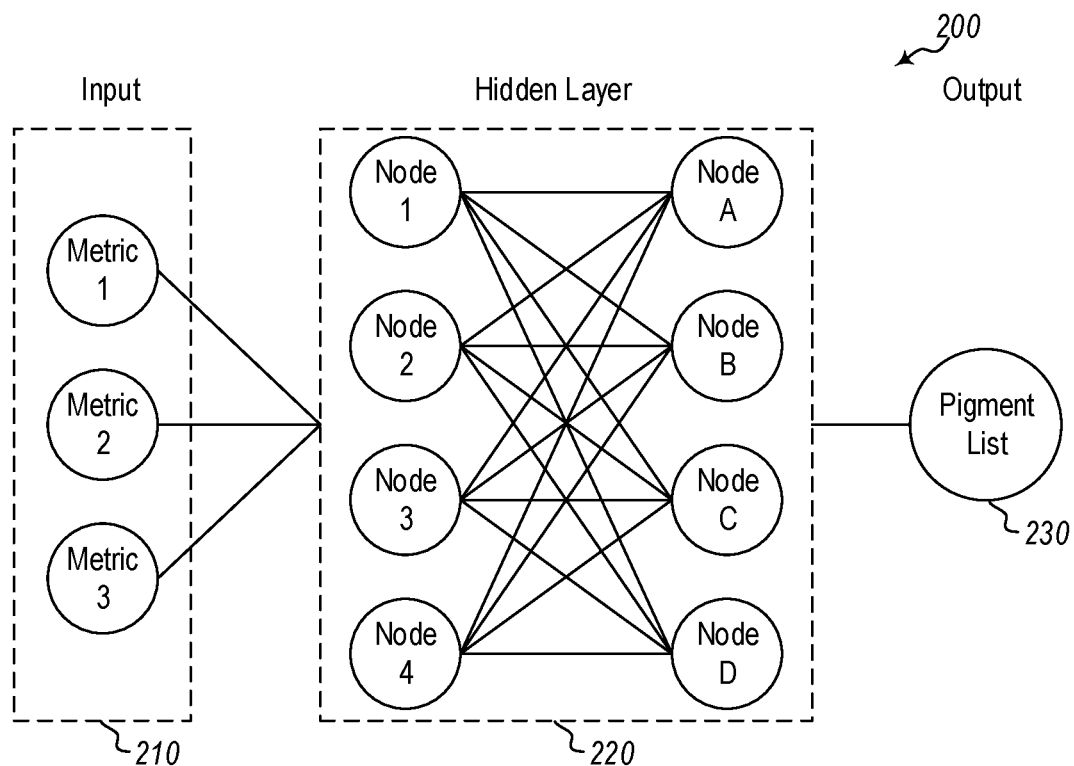
FIG. 2 illustrates a schematic diagram of a probabilistic colorant analysis system.

As further explanation and example of the function of the colorant decision points disclosed above, FIG. 2 illustrates a schematic diagram of a probabilistic colorant analysis system that comprises a set of colorant decision points 200. The depicted colorant decision points 200 are separated into an input group 210, a hidden layer 220, and an output 230. The colorant decision points 200 can be otherwise separated into different sets. Further, the output 230 may comprise information passed to a formulation engine 170.

Computer system 100 can process colorant decision points 200 within the hidden layer 220 in parallel. For example, FIG. 2 shows that the lines connecting the different colorant decision points 200 to each other do not indicate a flow or order of processing. Instead, the lines indicate probabilistic relations that will be described further below. Additionally, the input group 210 can comprise a second set of colorant decision points 200 that the computer system 100 can calculate prior to calculating the first set of colorant decision points 200 within the hidden layer 220. For example, prior to processing the first set of colorant decision points 200 within the hidden layer, the probabilistic colorant analysis software application 102 initiates a second set of colorant decision points 200 within the input group 210. The second set of colorant decision points 200 within the input group 210 are different than the first set of colorant decision points 200 within the hidden layer 220.

The colorant decision points 200 within the input group 210 may comprise broad colorant classification decision points relating to whether the target coating comprises a solid colorant, an effect pigment, and other similar broad colorant classification. The input group 210 can also or alternatively comprise colorant decision points relating to whether the target coating is a stain, enamel, latex, or some other class of coating. Additionally, the probabilistic colorant analysis software application 102 may be capable of processing the colorant decision points 200 within the input group 210 in parallel.

The colorant decision points 200 within the input group 210 may be calculated prior to calculating the colorant decision points 200 within the hidden layer 220. For instance, the probabilistic colorant analysis software application 102 may comprise multiple different sets of colorant decision points 200 that reside within the hidden layer. One particular set of colorant decision points 200 may be directed towards identifying the composition of a stain, while another set of colorant decision points 200 may be directed towards identifying a latex coating. As such, the solutions to the colorant decision points 200 within the input group 210 can determine which set of colorant decision points 200 within the hidden layer 220 to use. Using the input group 210 to identify a particular set of colorant decision points 200 to calculate may increase efficiency within the system by, for example, preventing the unnecessary calculation of stain-based colorant decision points 200 when the underlying target coating is a latex coating. In contrast, in some cases, every available colorant decision point 200 within the hidden layer can be calculated without regard to the results of the colorant decision points 200 within the input group 210.

Figure 3:
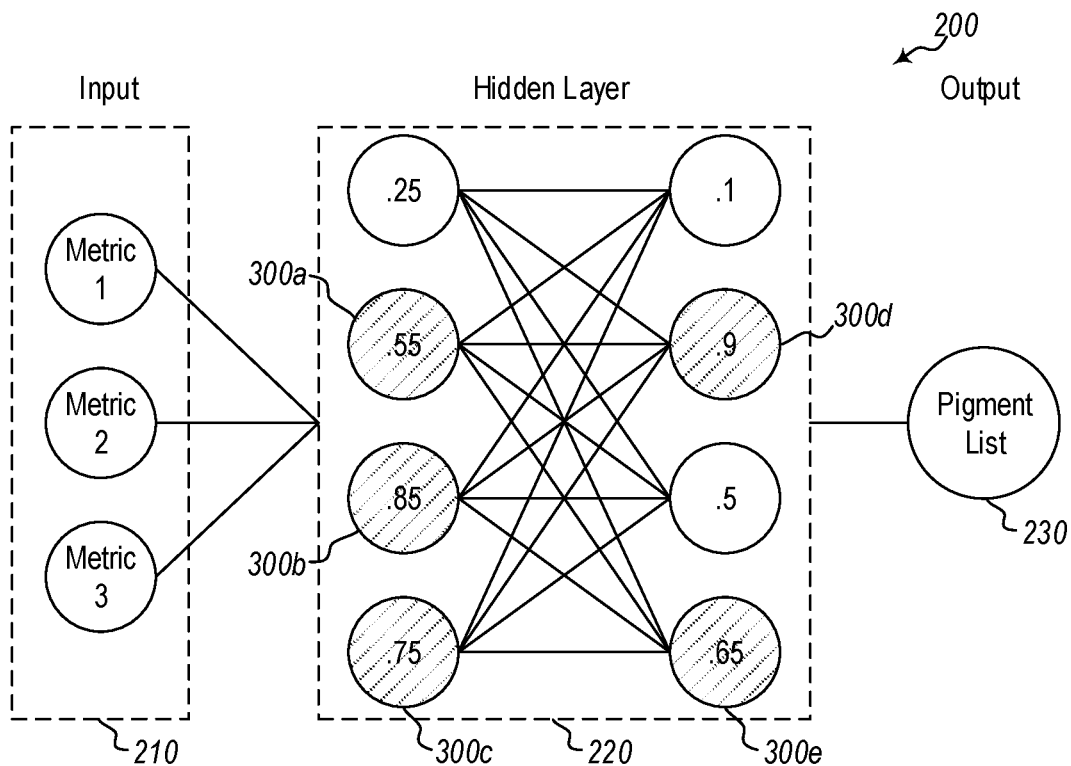
FIG. 3 illustrates a schematic diagram of a probabilistic colorant analysis system in use.

The one or more processors 110(a-c) within the computer system 100 can process the results of the colorant decision points 200 to arrive at a set of final colorant probabilities. For example, FIG. 3 illustrates a schematic diagram of a probabilistic colorant analysis system in use. Similar to the colorant decision points 200 of FIG. 2, FIG. 3 comprises colorant decision points 200 divided into an input group 210, a hidden layer 220, and an output 230, albeit represented now as probabilities.

In FIG. 3 the colorant decision points 200 have been processed and the results are indicated with respect to each of the colorant decision points 200. Once the colorant decision points 200 have been calculated, the decision point manager 150 calculates the proposed group of colorants. The proposed group of colorants comprises a list of potential colorants that the probabilistic colorant analysis software application 102 identified as possibly being within the target coating 140. Additionally, the proposed group of colorants can also comprise a probability associated with each colorant that the colorant is present within the target coating 140.

The computer system 100 may use different methods and processes to calculate the proposed group of colorants. For example, the probabilistic colorant analysis software application 102 can calculate each colorant probability within the proposed group of colorants using a Bayesian analysis. A Bayesian analysis is based on probabilistic reasoning from Bayes' Theorem, which is derived from the conditional probability's definition. Bayes Theorem is reproduced below for reference.

$$P(A \mid B) = \frac{P(B \mid A)P(A)}{P(B)}$$

where: $P(B) \neq 0$

When applying a Bayesian analysis, the probabilistic colorant analysis software application 102 gathers the probabilities that were calculated by each of the colorant decision points 200 and processes them using the Bayes Theorem. In particular, relying upon knowledge about general colorant attributes that are stored within the computer-readable media 120 (shown in FIG. 4), the probabilistic colorant analysis software application 102 is aware of particular relationships between unique subsets of colorant decision points 200 that indicate specific colorants. For example, computer-storage media 120 may store a database of relationships between unique subset of colorant decision points 200 and specific colorants. As such, the probabilistic colorant analysis software application 102 can identify different subsets of colorant decision points 200 that have high, combined probabilities and then compare these subsets to data stored in computer-storage media 120. The exemplary lines extending between colorant decision points 200 in FIG. 3 indicate these relationships.

For example, in FIG. 3, the probabilistic colorant analysis software application 102 identifies a unique subset of colorant decision points 300(a-e) (shown with striped backgrounds) as relating to a particular potential colorant. The probabilistic colorant analysis software application 102 calculates a colorant probability that indicates the probability that the particular potential colorant is within the target coating 140. The probabilistic colorant analysis software application 102 can calculate the colorant probability by applying a Bayesian analysis to each of the results of the colorant decision points 300(a-e).

Additionally, the probabilistic colorant analysis software application 102 can apply different weightings to each probability within the unique subset of probabilities calculated by the unique subset of colorant decision points 300(a-e). For example, for a particular potential colorant, the probabilistic colorant analysis software application 102 may weight, within the Bayesian analysis, the results of decision point 300a less than the results of decision point 300d. The computer system 100 may store the various weightings within the computer-readable media 120, including multiple different weightings for each different potential colorant. The different weightings may be based upon previous analysis by the application 102, and/or knowledge of colorant characteristics within the application 102, and/or provided by an end user. Additionally, the probabilistic colorant analysis software application 102 can actively update the weightings based upon feedback provided by an end-user that indicates whether potential colorants were correctly selected.

Figure 4:
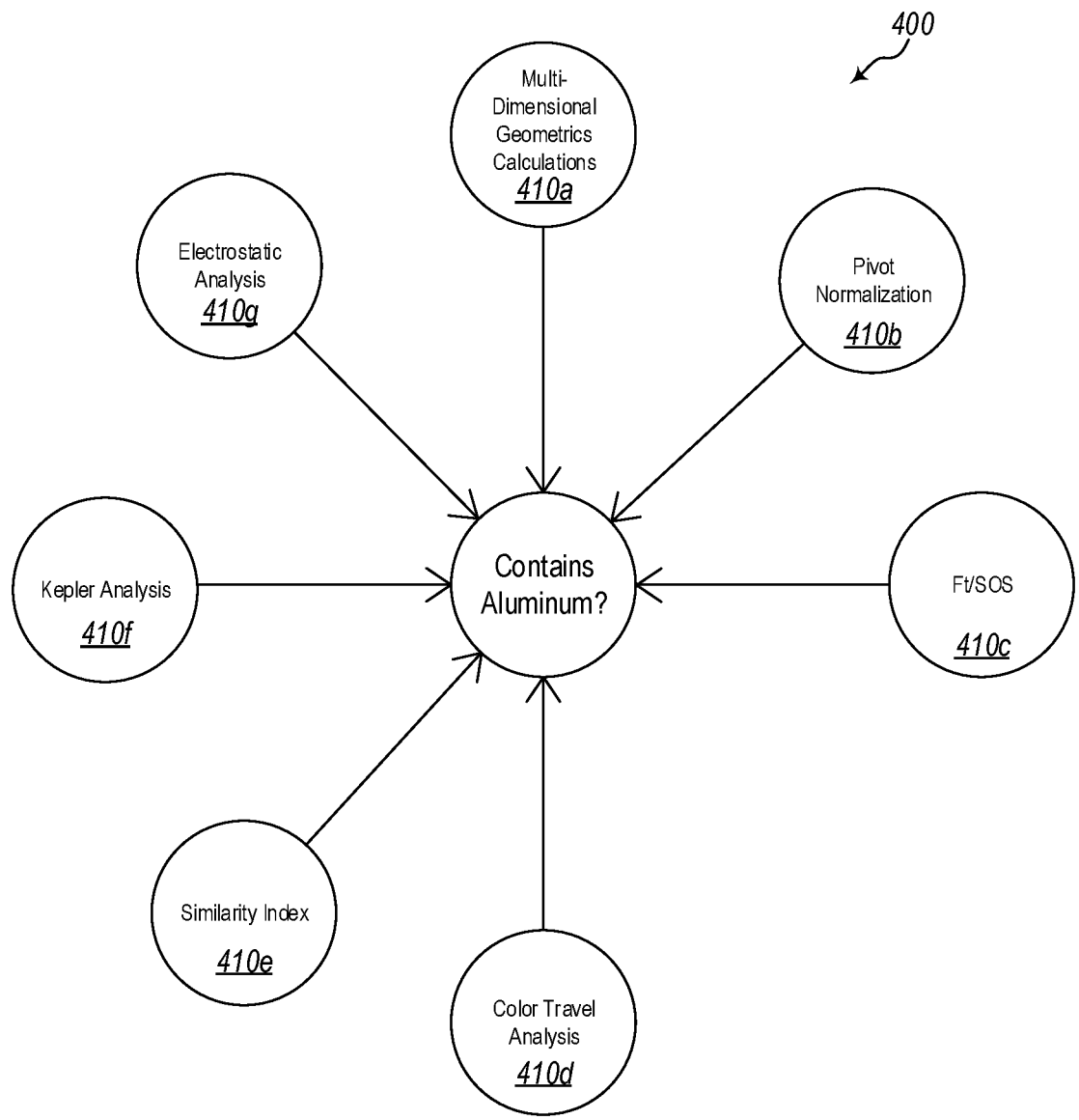
FIG. 4 illustrates a schematic diagram of a colorant decision point within a probabilistic colorant analysis system.

FIG. 4 illustrates a schematic diagram of a particular colorant decision point 400 within a probabilistic colorant analysis system. The depicted particular colorant decision point 400 comprises one or more computer-executable instructions within the application 102 that executes a number of calculations on given inputs, such as inputs from spectrometric data, e.g. received from a spectrophotometer. For example, the colorant decision point 400 can be configured to provide a probability that the target coating 140 contains an aluminum effect pigment type. Colorant decision points executed in the computer system 100 may also be directed towards providing probabilities that a target coating (e.g., 140) contains effect pigment types such as an organic/natural mica, specific colored micas, a man-made mica, a colored aluminum, particular colors of aluminum, particular sizes of effect particles, and various other effect pigment types.

FIG. 4 further shows that the depicted particular colorant decision point 400 can comprise a set of independent calculations 410(a-g) that can include seven different coating-based assessments. For example, independent calculation 410d comprises a calculation relating to the color travel, independent calculation 410f comprises a calculation using Kepler's laws of motion, and calculation 410g comprises a calculation based upon electrostatic characteristics of a target coating 140. While the set of independent calculations 410(a-g) comprises seven specific results arrived at via different processes and/or calculations, the particular colorant decision point 400 may comprise fewer, more, or different independent means/calculations.

Each colorant decision point 400 can be directed towards identifying a colorant, such as a particular effect pigment type, and each calculation within the set of independent calculations 410(a-g) produces a result that indicates the presence of the particular effect pigment type. The colorant decision point 400 gathers and processes the results of each independent calculation 410(a-g) in order to arrive at a probability that the particular effect pigment type is present within the target coating 140. For example, the colorant decision point 400 may determine that an effect pigment in the form of aluminum flake is present at an 80% probability based on each of the measurements of the target coating 140 for electrostatic analysis 410g, color travel analysis 410d, and Kepler analysis 410f of the received spectrometric data, and with further comparison of the measured/calculated values against those known for other coatings comprising aluminum flake.

When processing the results of the independent calculations, the colorant decision point 400 can calculate a Bayesian probability that the particular effect pigment type is within the target coating 140. For example, the colorant decision point 400 processes results from the independent calculations (generally simultaneously) using a Bayesian analysis in order to produce the probability for the colorant decision point. Additionally, each independent calculation within the set of independent calculations 410(*a-g*) can be associated with a weighting factor. Because different independent calculations may be more or less accurate, the colorant decision point 400 weights the results of each independent calculation accordingly. Further, the system 100 can normalize the results of each independent calculation so that it reflects a probability that the particular effect pigment type is within the target coating 140.

Accordingly, a first colorant decision point 400 can be directed towards identifying an aluminum effect pigment within a target coating 140. A first set of independent calculations 410(*a-g*) associated with the first colorant decision point 400 may comprise calculations of the spectrometric data that are specific to providing the independent assessment about the presence of the aluminum effect pigment within the target coating 140.

A second colorant decision point (not shown) can comprise computer-executable instructions used within or in connection with the application 102 and may be directed towards identifying a mica effect pigment within a target coating 140. In order to identify the mica effect pigment, a second set of independent calculations (not shown) may be associated with the second colorant decision point (not shown). The second set of independent calculations may comprise calculations of the spectrometric data that are specific to providing an independent assessment about the presence of the mica effect pigment within the target coating 140. At least a portion of the same independent calculations can be used in both the first colorant decision point 400 and the second colorant decision point. Nevertheless, the system 100 can associate each independent calculation within the first set of independent calculations with a different weighting than the independent calculation within the second set of independent calculations.

Based upon the results of multiple, different colorant decision points (e.g., colorant decision points 200 shown in FIG. 2), the probabilistic colorant analysis software application 102 can calculate a proposed group of colorants. The proposed group of colorants may be a list of all potential colorants detected within the target coating 140. Alternatively, the proposed group of colorants may comprise only a specific portion of the potential colorants that are associated with the highest associated probabilities.

FIG. 5 illustrates an exemplary table comprising spectrometric data 132 (also shown in FIG. 1) received from a spectrophotometer 130 (shown in FIG. 1) for a particular target coating (e.g., 140). In particular, the depicted spectrometric data 132 comprises reflectance data corresponding to a target coating, the reflectance data being received at the listed wavelengths and angles. Each colorant decision point 200 can receive the entire set of spectrometric data 132. Further, at least a portion of the colorant decision points 200 can also receive input data from other devices. For example, the colorant decision points can receive input data from magnetic sensors, hardness sensors, mass spectrometers, user input, or any other data source. The I/O interface 160 (shown in FIG. 1) feeds the received data to the appropriate colorant decision points. Because the colorant decision points 200 are each independently executable, the decision point manager 150 is able to cause the colorant decision points 200 to be processed in parallel without regard to the input data that each receives.

Figure 6:
FIG. 6 illustrates a table comprising a set of final colorants and associated final colorant probabilities.

FIG. 6 illustrates a table comprising an exemplary set of calculated colorants and associated colorant probabilities 600. In the depicted table, colorants are represented by letters in the alphabet. In practice, however, one will appreciate that instead of merely listing a letter in the alphabet, the actual potential colorant would be listed. In addition to listing the different colorants, the table also lists a probability associated with each colorant.

As depicted, at least a portion of colorants are associated with a zero percent probability of being present within the target coating 140. In contrast, some of the colorants are associated with a one-hundred percent chance of being in the target coating 140. One will appreciate that the depicted probabilities are merely exemplary and that in practice the probabilities may range based upon the results from different subset of colorant decision points. As such, the probabilistic colorant analysis software application 102 provides a set of colorant probabilities that indicate different colorants and respective probabilities that the different colorants are within a target coating 140.

Turning now to the graphical user interface 180 described above, FIG. 7 depicts the graphical user interface 180 for selecting colorants within a formulation engine 170. As depicted, the graphical user interface 180 can comprise graphical indicates of colorant names 710(*a-e*), images of each colorant 720(*a-e*), indications of probabilities associated with each colorant 730(*a-e*), and one or more selectable interface elements 740(*a-e*). As such, the graphical user interface 180 provides a user with visual information about each colorant within the proposed group of colorants that can aid the user in excluding and/or including particular colorants.

Further, as depicted, the one or more selectable interface elements 740(*a-e*) allow a user to explicitly include and/or exclude particular colorants from a user-defined group of colorants. As used herein, a "selectable interface element" comprises any means of input within a graphical user interface. For example, the selectable interface element may comprise a radio button, a text box, selectable text, a physical button adjacent to the graphical user interface 180, or any other similar means of input. In the depicted example, the one or more selectable interface elements 740(*a-e*) comprise check boxes of which only selectable interface element 740*b* is unmarked. In view of the present disclosure, one will appreciate that unmarking selectable interface element 740*b* the user may be excluding "Colorant B" (indicated as 710*b*) from the formulation engine 170. In contrast, in at least one embodiment, each of the selectable interface elements 740(*a-e*) allows a user to explicitly include a particular colorant within the input to a formulation engine 170.

One will appreciate that providing a user with the names 710(*a-e*) of the proposed colorants, the image 720(*a-e*) of the proposed colorants, and the respective probabilities 730(*a-e*) associated with each colorant allows a user to optimize the input to a formulation engine by including and/or excluding particular colorants. For example, a user may visually determine that Colorant D (indicate as 710*d*) is definitely not present within the target coating 140. By removing Colorant D from the formulation engine input, the user can significantly reduce the iterative workload of the formulation engine 170. Similarly, the user may have industry knowledge that indicates that Colorant A is certainly present within the target coating 140. By including Colorant A within the formulation engine input, the user can significantly reduce the iterative workload of the formulation engine 170.

One will appreciate that the present invention can also be described in terms of methods comprising one or more acts for accomplishing a particular result. For example, FIGS. 8 and 9 and the corresponding text illustrate flowcharts of a sequence of acts in methods for generating an optimized coating formulation through a user interface. The acts of FIGS. 8-9 are described below with reference to the components and modules illustrated in FIGS. 1-7.

Figure 8:
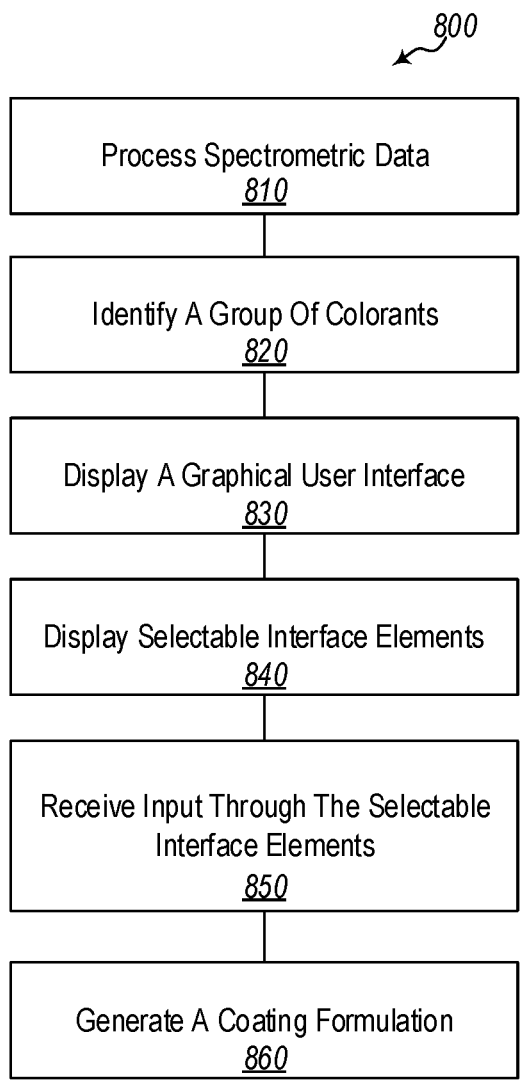
FIG. 8 depicts a flow chart of steps within a method for generating an optimized coating formulation through a user interface.
Figure 9:
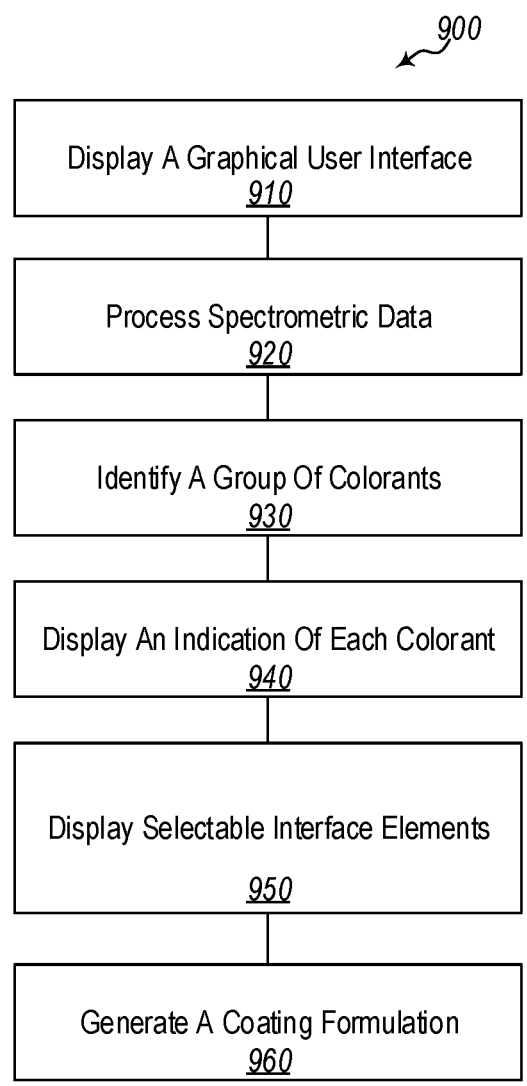
FIG. 9 depicts a flow chart of steps within another method for generating an optimized coating formulation through a user interface.

For instance, FIG. 8 illustrates that a method 800 for generating an optimized coating formulation for a target coating through a user interface can include an act 810 of processing spectrometric data 132. Act 810 can comprise process spectrometric data 132 through a probabilistic colorant analysis, wherein the probabilistic colorant analysis generates a set of colorants, each colorant within the set of colorants being associated with a calculated probability that the associated colorant is present within a target coating. For example, as depicted and described with respect to FIGS. 1 and 4, a spectrophotometer 130 scans a target coating 140. Based upon the scan, the spectrophotometer 130 then sends spectrometric data 132 in the form of reflectance values to the probabilistic colorant analysis software application 102.

FIG. 8 also illustrates that the method 800 comprises an act 820 of identifying a group of colorants. Act 820 can include identifying a proposed group of colorants from within the set of colorants. The proposed group of colorants can comprise colorants selected from the set of colorants that are associated with the highest calculated probabilities of being present within the target coating. For example, as depicted and described with respect to FIGS. 1, 2, and 5, the probabilistic colorant analysis software application 102 processes the spectrometric data 132 through a system of colorant decision points (shown as 200 in FIG. 2). Based upon the results of the colorant decision points 200, the probabilistic colorant analysis software application 102 generates a proposed group of colorants and associated colorant probabilities 500.

Additionally, FIG. 8 illustrates that the method 800 comprises an act 830 of displaying a graphical user interface 180. Act 830 can include displaying on a graphical user interface 180 an indication of each colorant 710(a-e) within the proposed group of colorants. For example, as depicted and described with respect to FIGS. 1 and 7, the graphical user interface 180 can display various information about the colorants within the group of proposed colorants. For instance, the graphical user interface 180 can display the colorants' names 710(a-e), images 720(a-e) of the colorants, probabilities 720(a-e) associated with the colorants, and various additional information.

FIG. 8 also illustrates that the method 800 comprises an act 840 of displaying selectable interface elements 740(a-e). Act 840 can include displaying one or more selectable interface elements on the graphical user interface. The one or more selectable interface elements 740(a-e) are configured to select individual colorants within the proposed group of colorants. For example, as depicted and described with respect to FIG. 7, the graphical user interface 180 comprises one or more selectable interface elements 740(a-e) that allow a user to create a user-defined group of colorants by including and/or excluding particular colorants from the group of proposed colorants.

Further, FIG. 8 illustrates that the method 800 comprises an act 850 of receiving input through the selectable interface elements. Act 850 can include receiving input through the one or more selectable interface elements 740(a-e), wherein the input defines a user-defined group of colorants selected from the proposed group of colorants. For example, as depicted and described with respect to FIG. 7, a user has created a user-defined group of colorants 710a, 710c, 710d, 710e by excluding Colorant B from the group of proposed colorants 710(a-e).

Further still, FIG. 8 illustrates that the method 800 comprises an act 860 of generating a coating formulation. Act 860 can include generating a coating formulation. The coating formulation can be generated from the user-defined group of colorants. For example, as depicted and described with respect to FIG. 1, the user-defined colorant group is provided to a formulation engine 170. The formulation engine iteratively processes the colorants within the user-defined colorant group until an acceptable coating formulation is generated. For example, as depicted and described above with respect to FIG. 1, the probabilistic colorant analysis software application 102 may continue to iteratively add colorants to the formulation engine 170 until a predetermined qualitative or quantitative threshold is met.

Turning to FIG. 9, FIG. 9 illustrates that another method 900 for generating an optimized coating formulation for a target composition through a user interface can include an act 910 of displaying a graphical user interface. Act 910 can comprise displaying on a display device (e.g., computer system 100) a graphical user interface 180 for completing a spectrometric scan of a target coating 140. For example, as depicted and described with respect to FIGS. 1 and 4, a graphical user interface 180 on a computer system 100 can be presented for completing a spectrometric scan of a target coating 140, for example by a spectrophotometer or any other type of spectrometric device in communication with the computer system.

FIG. 9 also illustrates that the method 900 comprises an act 920 of processing spectrometric data. Act 920 can include processing spectrometric data through a probabilistic colorant analysis. The probabilistic colorant analysis generates a set of colorants, each colorant within the set of colorants being associated with a calculated probability that the associated colorant is present within the target coating. For example, as depicted and described with respect to FIGS. 1, 2, and 5, the probabilistic colorant analysis software application 102 may process the spectrometric data 132 through a system of colorant decision points (shown as 200 in FIG. 2). Based upon the results of the colorant decision points 200, the probabilistic colorant analysis software application 102 may then generate a proposed group of colorants and associated colorant probabilities 500.

Additionally, FIG. 9 illustrates that the method 900 comprises an act 930 of identifying a group of colorants. Act 930 can include identifying a proposed group of colorants from within the set of colorants. The proposed group of colorants can comprise colorants selected from the set of colorants that are associated with the highest calculated probabilities of being present within the target coating. For example, as depicted and described with respect to FIGS. 1, 2, and 5, the probabilistic colorant analysis software application 102 may process the spectrometric data 132 through a system of colorant decision points (shown as 200 in FIG. 2). Based upon the results of the colorant decision points 200, the probabilistic colorant analysis software application 102 may generate a proposed group of colorants and associated colorant probabilities 500.

FIG. 9 also illustrates that the method 900 comprises an act 940 of displaying an indication of each colorant. Act 940 can include displaying on the graphical user interface 180 an indication of each colorant within the proposed group of colorants corresponding to the target coating. For example, as depicted and described with respect to FIGS. 1 and 7, the graphical user interface 180 can display various information about the colorants within the group of proposed colorants. For instance, the graphical user interface 180 can display the colorants' names 710(a-e), images 720(a-e) of the colorants, probabilities 720(a-e) associated with the colorants, and various additional information.

Further, FIG. 9 illustrates that the method 900 comprises an act 950 of displaying selectable interface elements 740 (a-e). Act 950 can include displaying one or more selectable interface elements on the graphical user interface. The one or more selectable interface elements 740(a-e) are configured to allow selecting one or more individual colorants within the proposed group of colorants. For example, as depicted and described with respect to FIG. 7, the graphical user interface 180 may comprise one or more selectable interface elements 740(a-e) that allow a user to create a user-defined group of colorants by including and/or excluding particular colorants from the group of proposed colorants.

Further still, FIG. 9 illustrates that the method 900 comprises an act 960 of generating a coating formulation. Act 960 can include, upon receipt of user input, generating a coating formulation through a formulation engine. The coating formulation can be generated from user selected colorants of the proposed group of colorants. For example, as depicted and described with respect to FIG. 1, the user-defined colorant group may be provided to a formulation engine 170. The formulation engine iteratively processes the colorants within the user-defined colorant group until an acceptable coating formulation is generated. For example, as described above, the probabilistic colorant analysis software application 102 may continue to iteratively add colorants to the formulation engine 170 until a predetermined qualitative or quantitative threshold is met.

Accordingly, FIGS. 1-9 and the corresponding text illustrate or otherwise describe a number of components, schematics, and mechanisms for generating an optimized coating formulation for a target coating through a user interface. One will appreciate that these components and modules in accordance with the present invention provide fast, flexible, and accurate identification of texture effects within a target coating 140. For example, an end user can scan a target coating 140 with a spectrophotometer 130. In response, a probabilistic colorant analysis software application 102 can process colorant decision points 200 in parallel and produce a proposed group of colorants that includes probabilities that particular colorants are present within the target coating 140. The user can then optimize the proposed group of colorants through a user interface 180 by excluding and/or including individual colorants from the proposed group of colorants. The user-defined group of colorants can then be iteratively fed into a formulation engine until a predetermined qualitative or quantitative threshold is met.

The probabilistic colorant analysis can be performed using methods other than a Bayesian analysis and/or decision points. For example, a probability analysis other than a Bayesian analysis can be utilized to generate individual probabilities that colorants are present within a coating. Further, the probabilistic colorant analysis can be directed towards the use of color identification within fabrics, papers, and other products outside of coatings.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may comprise or utilize a special-purpose or general-purpose computer system that includes computer hardware, such as, for example, one or more processors and system memory, as discussed in greater detail below. The present invention can also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, the present invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

A cloud-computing environment may comprise a system that includes one or more hosts that are each capable of running one or more virtual machines. During operation, virtual machines emulate an operational computing system, supporting an operating system and perhaps one or more other applications as well. Each host may include a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

In view of the foregoing the present invention relates for example, without being limited thereto, to the following aspects:

1. A computerized method of generating an optimized coating formulation for a target coating through a user interface making use of a computer system comprising one or more processors and one or more computer-readable media having stored thereon executable instructions that when executed by the one or more processors configure the computer system to perform in accordance with the method, the method comprising:
  receiving by the computer system spectrometric data related to a target coating;
  processing the spectrometric data, by the one or more processors, through a probabilistic colorant analysis, wherein the probabilistic colorant analysis generates a set of colorants, each colorant within the set of colorants being associated with a calculated probability that the associated colorant is present within the target coating;
  identifying, by the one or more processors, a proposed group of colorants from within the set of colorants, wherein the proposed group of colorants comprises colorants selected from the set of colorants that are associated with the highest calculated probabilities of being present within the target coating;
  displaying, by the one or more processors, on the graphical user interface an indication of each colorant within the proposed group of colorants corresponding to the target coating;
  displaying, by the one or more processors, one or more selectable interface elements on the graphical user interface, wherein the one or more selectable interface elements are configured to allow selecting one or more individual colorants within the proposed group of colorants; and
  upon receipt of user input through the one or more selectable interface elements, generating, by the one or more processors, a coating formulation from user selected colorants of the proposed group of colorants.

2. The computerized method according to preceding Aspect 1, wherein the displayed indication of each colorant comprises a name and image of each colorant.

3. The computerized method according to any one of preceding Aspects 1 or 2, wherein the spectrometric data are received from a spectrophotometer in communication with the computer system.

4. The computerized method according to any one of preceding Aspects 1 to 3, further comprising transferring the generated coating formulation to a paint mixing system in communication with the computer system and producing a corresponding coating formulation by the paint mixing system.

5. The computerized method according to any one of preceding Aspects 1 to 4, wherein generating the coating formulation comprises processing, by the one or more processors, at least a portion of the colorants within the user-defined group of colorants through a formulation engine.

6. The computerized method according to Aspect 5, wherein the formulation engine applies a Kubelka-Munk analysis.

7. The computerized method according to any one of Aspects 5 or 6, wherein processing at least a portion of the colorants within the user-defined group of colorants through the formulation engine comprises:
  iteratively adding colorants selected from the user-defined group of colorants to the formulation engine in order of decreasing calculated probability of the colorant being present within the target coating until a predetermined qualitative or quantitative threshold is met.

8. The computerized method according to any one of preceding Aspects 1 to 7, wherein the probabilistic colorant analysis comprises processing, by the one or more processors, the spectrometric data through a set of colorant decision points, each colorant decision point within the set of colorant decision points comprising a set of independent calculations of the spectrometric data that each provide an independent assessment about the presence of a particular effect pigment type within the target coating.

9. The computerized method according to any one of preceding Aspects 1 to 8, wherein processing the spectrometric data, by the one or more processors, through the probabilistic colorant analysis comprises:
initiating a set of colorant decision points, wherein each colorant decision point comprises a set of independent calculations of the spectrometric data that each provide an independent assessment about the presence of a particular effect pigment type within the target coating;
calculating in parallel for each colorant decision point within the set of colorant decision points a probability that a different effect pigment type is present within the target coating;
calculating a set of final colorant probabilities, wherein each final colorant probability within the set of final colorant probabilities is calculated by combining a unique subset of probabilities calculated by the set of colorant decision points; and
associating each final colorant probability with a final colorant from within the set of final colorants.

10. The computerized method according to any one of the preceding Aspects 1 to 9, wherein each colorant probability, such as each final colorant probability within the set of final colorant probabilities, is calculated using a Bayesian analysis.

11. A computerized system for generating an optimized coating formulation through a user interface, for example by practicing the method according to any one of the preceding Aspects 1 to 10, comprising:
a computer system comprising one or more processors and one or more computer-readable media having stored thereon executable instructions that when executed by the one or more processors configure the computer system to perform at least the following:
receive spectrometric data related to a target coating;
process spectrometric data through a probabilistic colorant analysis, wherein the probabilistic colorant analysis generates a set of colorants, each colorant within the set of colorants being associated with a calculated probability that the associated colorant is present within a target coating;
identify a proposed group of colorants from within the set of colorants, wherein the proposed group of colorants comprises colorants selected from the set of colorants that are associated with the highest calculated probabilities of being present within the target coating;
display on a graphical user interface an indication of each colorant within the proposed group of colorants;
display one or more selectable interface elements on the graphical user interface, wherein the one or more selectable interface elements are configured to allow selecting one or more individual colorants within the proposed group of colorants;
receive input through the one or more selectable interface elements, wherein the input defines a user-defined group of colorants selected from the proposed group of colorants; and
generate a coating formulation from the user-defined group of colorants.

12. The computerized system according to Aspect 11, wherein the displayed indication of each colorant comprises a name and image of each colorant.

13. The computerized system according to any one of preceding Aspects 11 or 12, further comprising a spectrophotometer in communication with the computer system from which the spectrometric data related to the target coating are received.

14. The computerized system according to any one of preceding Aspects 11 to 13, wherein generating the coating formulation comprises processing at least a portion of the colorants within the user-defined group of colorants through a formulation engine.

15. The computerized system according to Aspect 14, wherein the formulation engine applies a Kubelka-Munk analysis.

16. The computerized system according to any one of Aspects 14 or 15, wherein processing at least a portion of the colorants within the user-defined group of colorants through the formulation engine comprises:
iteratively adding colorants selected from the user-defined group of colorants to the formulation engine in order of decreasing calculated probability of the colorant being present within the target coating until a predetermined qualitative or quantitative threshold is met.

17. The computerized system according to any one of preceding Aspects 11 to 16, further comprising a paint mixing system in communication with the computer system for production of the generated coating formulation.

18. The computerized system according to any one of preceding Aspects 11 to 17, wherein the probabilistic colorant analysis comprises processing the spectrometric data through a set of colorant decision points, each colorant decision point within the set of colorant decision points comprising a set of independent calculations of the spectrometric data that each provide an independent assessment about the presence of a particular effect pigment type within the target coating.

19. The computerized system according to any one of preceding Aspects 11 to 18, wherein processing the spectrometric data through a probabilistic colorant analysis comprises:
initiating a set of colorant decision points, wherein each colorant decision point comprises a set of independent calculations of the spectrometric data that each provide an independent assessment about the presence of a particular effect pigment type within the target coating;
calculating in parallel for each colorant decision point within the set of colorant decision points a probability that a different effect pigment type is present within the target coating;
calculating a set of final colorant probabilities, wherein each final colorant probability within the set of final colorant probabilities is calculated by combining a unique subset of probabilities calculated by the set of colorant decision points; and
associating each final colorant probability with a final colorant from within the set of final colorants.

20. The computerized system according to any one of preceding Aspects 11 to 19, wherein each colorant probability, such as each final colorant probability within the set of final colorant probabilities, is calculated using a Bayesian analysis.

21. A computer program product comprising one or more computer-readable storage media having stored thereon computer-executable instructions that, when executed by a processor, cause a computer system, such as a computer system being part of a computerized system as defined in any one of preceding Aspects 11 to 20, to perform a method for generating an optimized coating formulation through a user interface as defined in any one of preceding Aspects 1 to 10.

The present invention may be embodied in other specific forms without departing from its spirit or essential characteristics. The described preset invention is to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computer system for optimizing a coating formulation through a user interface, comprising:
   one or more processors; and
   one or more computer-readable media having stored thereon executable instructions that when executed by the one or more processors configure the computer system to perform at least the following:
      process spectrometric data through a probabilistic colorant analysis, wherein the probabilistic colorant analysis generates a set of colorants, each colorant within the set of colorants being associated with a calculated probability that the associated colorant is present within a target coating;
      identify a proposed group of colorants from within the set of colorants, wherein the proposed group of colorants comprise colorants selected from the set of colorants that are associated with the highest calculated probabilities of being present within the target coating;
      display on a graphical user interface an indication of each colorant within the proposed group of colorants;
      display one or more selectable interface elements on the graphical user interface, wherein the one or more selectable interface elements are configured to select individual colorants within the proposed group of colorants;
      receive input through the one or more selectable interface elements, wherein the input defines a user-defined group of colorants selected from the proposed group of colorants; and
      generate a coating formulation, wherein the coating formulation is generated from the user-defined group of colorants.

2. The computer system of claim 1, wherein the indication of each colorant comprises a name and image of each colorant.

3. The computer system of claim 1, wherein the executable instructions include instructions that are executable to configure the computer system to receive spectrometric data from a spectrophotometer.

4. The computer system of claim 1, wherein generating a coating formulation comprises processing at least a portion of colorants within the user-defined group of colorants through a formulation engine.

5. The computer system of claim 4, wherein the formulation engine applies a Kubelka-Munk analysis.

6. The computer system of claim 4, wherein processing at least a portion of colorants within the user-defined group of colorants through a formulation engine comprises:
   iteratively adding final colorants selected from the user-defined group of colorants to the formulation engine in order of decreasing probability until a predetermined qualitative threshold is met.

7. The computer system of claim 1, wherein the executable instructions include instructions that are executable to configure the computer system to transmit the coating formulation to a coating mixing system for generation of the coating formulation.

8. The computer system of claim 1, wherein probabilistic colorant analysis comprises processing the spectrometric data through a set of colorant decision points, each colorant decision point within the set of colorant decision points comprising a first set of independent calculations of the spectrometric data that each provide an independent assessment about the presence of a first effect pigment type within the target coating.

9. The computer system of claim 1, wherein processing the spectrometric data through a probabilistic colorant analysis comprises:
   initiating a set of colorant decision points, wherein each colorant decision point comprises a set of independent calculations of the spectrometric data that each provide an independent assessment about the presence of a particular effect pigment type within the target coating;
   calculating in parallel each colorant decision point within the set of colorant decision points, wherein each colorant decision point provides a probability that a different effect pigment type is present within the target coating;
   calculating a set of final colorant probabilities, wherein each final colorant probability within the set of final colorant probabilities is calculated by combining a unique subset of probabilities calculated by the set of colorant decision points; and
   associating each final colorant probability with a final colorant from within the set of final colorants.

10. The computer system of claim 9, wherein each final colorant probability within the set of final colorant probabilities is calculated using a Bayesian analysis.

11. A computerized method for use on a computer system comprising one or more processors and one or more computer-readable media having stored thereon executable instructions that when executed by the one or more processors configure the computer system to perform a method of optimizing a coating formulation through a user interface, comprising:
   displaying on a display device a graphical user interface for completing a spectrometric scan of a target coating;
   processing spectrometric data through a probabilistic colorant analysis, wherein the probabilistic colorant analysis generates a set of colorants, each colorant within the set of colorants being associated with a calculated probability that the associated colorant is present within the target coating;
   identifying a proposed group of colorants from within the set of colorants, wherein the proposed group of colorants comprise colorants selected from the set of colorants that are associated with the highest calculated probabilities of being present within the target coating;
   displaying on the graphical user interface an indication of each colorant within the proposed group of colorants corresponding to the target coating;
   displaying one or more selectable interface elements on the graphical user interface, wherein the one or more selectable interface elements are configured to select individual colorants within the proposed group of colorants; and upon receipt of user input, generating a coating formulation, wherein the coating formulation is generated from user selected colorants of the proposed group of colorants.

12. The computerized method of claim 11, wherein the indication of each colorant comprises a name and image of each colorant.

13. The computerized method of claim 11, further comprising receiving spectrometric data from a spectrophotometer.

14. The computerized method of claim 11, wherein generating a coating formulation comprises processing at least a portion of colorants within the user-defined group of colorants through a formulation engine.

15. The computerized method of claim 14, wherein the formulation engine applies a Kubelka-Munk analysis.

16. The computer system of claim 14, wherein processing at least a portion of colorants within the user-defined group of colorants through a formulation engine comprises:

iteratively adding final colorants selected from the user-defined group of colorants to the formulation engine in order of decreasing probability until a predetermined qualitative threshold is met.

17. The computerized method of claim 11, wherein probabilistic colorant analysis comprises processing the spectrometric data through a set of colorant decision points, each colorant decision point within the set of colorant decision points comprising a first set of independent calculations of the spectrometric data that each provide an independent assessment about the presence of a first effect pigment type within the target coating.

18. The computerized method of claim 11, wherein processing the spectrometric data through a probabilistic colorant analysis comprises:

initiating a set of colorant decision points, wherein each colorant decision point comprises a set of independent calculations of the spectrometric data that each provide an independent assessment about the presence of a particular effect pigment type within the target coating;

calculating in parallel each colorant decision point within the set of colorant decision points, wherein each colorant decision point provides a probability that a different effect pigment type is present within the target coating;

calculating a set of final colorant probabilities, wherein each final colorant probability within the set of final colorant probabilities is calculated by combining a unique subset of probabilities calculated by the set of colorant decision points; and associating each final colorant probability with a final colorant from within the set of final colorants.

19. The computerized method of claim 18, wherein each final colorant probability within the set of final colorant probabilities is calculated using a Bayesian analysis.

20. A computer program product comprising one or more non-transitory computer storage media having stored thereon computer-executable instructions that, when executed at a processor, cause the computer system to perform a method for optimizing a coating formulation through a user interface, the method comprising:

displaying on a display device a graphical user interface for completing a spectrometric scan of a target coating;

processing spectrometric data through a probabilistic colorant analysis, wherein the probabilistic colorant analysis generates a set of colorants, each colorant within the set of colorants being associated with a calculated probability that the associated colorant is present within the target coating;

identifying a proposed group of colorants from within the set of colorants, wherein the proposed group of colorants comprise colorants selected from the set of colorants that are associated with the highest calculated probabilities of being present within the target coating;

displaying on the graphical user interface an indication of each colorant within the proposed group of colorants corresponding to the target coating;

displaying one or more selectable interface elements on the graphical user interface, wherein the one or more selectable interface elements are configured to select individual colorants within the proposed group of colorants; and upon receipt of user input, generating a coating formulation, wherein the coating formulation is generated from user selected colorants of the proposed group of colorants.

* * * * *